(12) United States Patent
Jones et al.

(10) Patent No.: US 11,673,238 B2
(45) Date of Patent: Jun. 13, 2023

(54) LOCKING SPANNER ASSEMBLY

(71) Applicant: The Boeing Company, Chicago, IL (US)

(72) Inventors: Nicholas A. Jones, Renton, WA (US); William C. Haas, Seattle, WA (US)

(73) Assignee: The Boeing Company, Arlington (VA)

(*) Notice: Subject to any disclaimer, the term of this patent is extended or adjusted under 35 U.S.C. 154(b) by 578 days.

(21) Appl. No.: 16/789,227

(22) Filed: Feb. 12, 2020

(65) Prior Publication Data
US 2021/0245337 A1  Aug. 12, 2021

(51) Int. Cl.
| | | |
|---|---|---|
| *B25B 13/48* | (2006.01) | |
| *B64D 13/06* | (2006.01) | |
| *F16L 3/23* | (2006.01) | |
| *B64D 47/00* | (2006.01) | |
| *F16L 3/24* | (2006.01) | |

(52) U.S. Cl.
CPC .............. *B25B 13/48* (2013.01); *B64D 13/06* (2013.01); *B64D 47/00* (2013.01); *F16L 3/23* (2013.01); *F16L 3/24* (2013.01); *B64D 2013/0603* (2013.01); *Y10T 403/59* (2015.01); *Y10T 403/60* (2015.01)

(58) Field of Classification Search
CPC ........ B25B 13/48; B64D 13/06; B64D 47/00; B64D 2013/0603; F16L 13/23; F16L 3/24; F16L 3/245; F16B 2/02; F16B 2/06; F16B 2/18; F16B 2/205; Y10T 403/59; Y10T 403/591; Y10T 403/595; Y10T 403/60; Y10T 403/608
See application file for complete search history.

(56) References Cited

U.S. PATENT DOCUMENTS

| | | | | |
|---|---|---|---|---|
| 3,897,701 A | * | 8/1975 | Daniels ................... | B25B 13/48 81/176.1 |
| 4,295,287 A | * | 10/1981 | Natzke .................. | E02F 3/3622 403/321 |
| 5,556,221 A | * | 9/1996 | Brunner .................... | F16B 2/10 403/321 |
| 5,713,157 A | * | 2/1998 | van Leeuwen ......... | F16L 3/245 52/39 |
| 6,203,236 B1 | * | 3/2001 | Gautier ..................... | E04G 5/04 403/321 |
| 6,945,585 B1 | * | 9/2005 | Liu ........................... | E05C 3/24 292/216 |
| 10,718,449 B2 | * | 7/2020 | Loss ....................... | B64C 1/406 |
| 2007/0055109 A1 | * | 3/2007 | Bass ...................... | A61B 17/02 600/234 |
| 2007/0170341 A1 | * | 7/2007 | Baumchen ............... | B60N 2/20 403/321 |
| 2010/0143029 A1 | * | 6/2010 | Omori ...................... | E05C 3/24 403/322.4 |
| 2012/0160962 A1 | * | 6/2012 | Holvoet ................... | H02G 3/32 244/131 |
| 2012/0251231 A1 | * | 10/2012 | Matsumoto ............ | B60N 2/366 403/326 |

(Continued)

*Primary Examiner* — Christopher Garft
(74) *Attorney, Agent, or Firm* — Kunzler Bean & Adamson (57) ABSTRACT

A locking spanner assembly for an aircraft is disclosed. A clasp can be secured to an anchor by urging the clasp onto the anchor. The anchor contacts a trigger which opens a gate assembly to release a locking member which locks to the anchor. A lever arm allows for release which resets the clasp.

20 Claims, 7 Drawing Sheets

(56) References Cited

U.S. PATENT DOCUMENTS

| | | | |
|---|---|---|---|
| 2013/0187014 A1* | 7/2013 | James | F16B 39/28 |
| | | | 248/222.14 |
| 2013/0189050 A1* | 7/2013 | James | F16B 37/043 |
| | | | 411/166 |
| 2014/0037371 A1* | 2/2014 | Mensch | B60N 2/01583 |
| | | | 403/328 |
| 2015/0377386 A1* | 12/2015 | Mitchell | F16L 3/245 |
| | | | 29/428 |
| 2016/0228316 A1* | 8/2016 | Hoel | A61G 13/06 |
| 2016/0265693 A1* | 9/2016 | Vu | B64D 13/00 |
| 2021/0245337 A1* | 8/2021 | Jones | B64D 13/00 |

* cited by examiner

LOCKING SPANNER ASSEMBLY

FIELD

This disclosure relates generally to assemblies for aircraft, and more particularly to a locking spanner assembly for an aircraft.

BACKGROUND

Aircraft manufacture presents unique challenges due to difficulty accessing portions of the aircraft. Manufacture, and specifically time and difficulty of manufacture, accounts for a significant expense to aircraft manufacturers. Many areas in the aircraft are simply too small or too awkward to access. Simplifying manufacturing processes saves time, money, and wear-and-tear on manufacturing equipment and personnel.

SUMMARY

The subject matter of the present application has been developed in response to the present state of the art, and in particular, in response to the shortcomings of assembling spanner assemblies in aircraft, that have not yet been fully solved by currently available techniques. Accordingly, the subject matter of the present application has been developed to provide a locking spanner assembly, and corresponding method, that overcome at least some of the above-discussed shortcomings of prior art techniques.

The following is a non-exhaustive list of examples, which may or may not be claimed, of the subject matter, disclosed herein.

Disclosed herein is a locking spanner assembly. The locking spanner assembly comprises a bracket comprising a first bracket arm, a second bracket arm, and a slot defined between the first bracket arm and the second bracket arm. The slot is configured to receive an anchor. The locking spanner assembly also comprises a trigger movably coupled to the bracket and movable relative to the bracket between a first position, in which a portion of the trigger extends into the slot, and a second position. As the anchor is fully seated into the slot the anchor causes the trigger to move from the first position to the second position. The locking spanner assembly further comprises a gate assembly movably coupled to the bracket and movable relative to the trigger along a path between a locked position and an unlocked position. The gate assembly comprises a first gate arm, a second gate arm, and a gate recess defined between the first gate arm and the second gate arm. The first gate arm has a cam surface configured to engage with the trigger such that movement of the trigger from the first position to the second position causes the gate assembly to move from the locked position to the unlocked position along the path. The locking spanner assembly additionally comprises a locking member rotatably coupled to the bracket and comprising a locking portion, a hinge, and a pin. The locking member is rotatable about the hinge between an open position, in which the pin is within the gate recess and no more than a first portion of the locking portion is within the slot, and a closed position, in which the pin is out of the gate recess and more than the first portion of the locking portion is within the slot. The locking member rotates from the open position to the closed position as the gate assembly moves from the locked position to the unlocked position such that in the closed position the locking portion of the locking member retains the anchor within the slot. The preceding subject matter of this paragraph characterizes example 1 of the present disclosure.

The trigger comprises a trigger head and a trigger tail. The trigger tail extends into the slot when the trigger is in the first position. The trigger head is shaped to contact the gate assembly such that movement of the trigger from the first position to the second position causes the gate assembly to move from the locked position to the unlocked position. The preceding subject matter of this paragraph characterizes example 2 of the present disclosure, wherein example 2 also includes the subject matter according to example 1, above.

The locking member further comprises a lever arm that extends from and is non-movably fixed to the locking portion of the locking member. Pivoting the lever arm about the hinge from the closed position to the locked position causes the locking portion to release from the anchor. The preceding subject matter of this paragraph characterizes example 3 of the present disclosure, wherein example 3 also includes the subject matter according to any one of examples 1-2, above.

Rotation of the locking member from the closed position to the open position causes the pin to contact the second gate arm and to move the gate assembly along the path to permit the pin to enter the gate recess. The preceding subject matter of this paragraph characterizes example 4 of the present disclosure, wherein example 4 also includes the subject matter according to any one of examples 1-3, above.

The movement of the bracket toward the anchor in a single direction causes the locking spanner to lock onto the anchor. The preceding subject matter of this paragraph characterizes example 5 of the present disclosure, wherein example 5 also includes the subject matter according to any one of examples 1-4, above.

The locking member further comprises an indicia member that protrudes from the bracket when the locking member is in the locked position and does not protrude from the bracket when the locking member in the open position. The preceding subject matter of this paragraph characterizes example 6 of the present disclosure, wherein example 6 also includes the subject matter according to any one of examples 1-5, above.

The locking spanner assembly further comprises an environmental control systems duct coupled to the locking spanner. The locking spanner and environmental control systems duct are in an aircraft. The preceding subject matter of this paragraph characterizes example 7 of the present disclosure, wherein example 7 also includes the subject matter according to any one of examples 1-6, above.

The path of the gate assembly between a locked position and an unlocked position is a linear path. The preceding subject matter of this paragraph characterizes example 8 of the present disclosure, wherein example 8 also includes the subject matter according to any one of examples 1-7, above.

The gate assembly further comprises a biasing member urging the gate assembly toward the locked position. The preceding subject matter of this paragraph characterizes example 9 of the present disclosure, wherein example 9 also includes the subject matter according to any one of examples 1-8, above.

The trigger comprises a trigger tail and a trigger head. The trigger tail extends at least partially into the recess. The trigger head is configured to contact the gate assembly. Forced rotation of the trigger tail causes rotation of the trigger head, but forced rotation of the trigger head does not cause rotation of the trigger tail. The preceding subject matter of this paragraph characterizes example 10 of the present disclosure, wherein example 10 also includes the subject matter according to any one of examples 1-9, above.

Further disclosed herein is a system for supporting a duct in an aircraft. The system comprises a duct configured to conduct fluid in an aircraft. The system also comprises a spanner bar configured to support the duct in the aircraft, the spanner bar having a first end and a second end. The system further comprises an anchor. The system also comprises clasps at each of the first and second ends of the spanner bar. Individual clasps comprise a bracket having a slot configured to receive the anchor, a trigger extending at least partially into the slot, a gate assembly coupled to the bracket, and a locking member. Movement of the trigger caused by the anchor causes the gate assembly to release the locking member to lock the clasp to the anchor. The preceding subject matter of this paragraph characterizes example 11 of the present disclosure.

The system further comprises an indicia member configured to visibly protrude when the locking member is in the locked position and obstructed from view while the locking member is in the open position. The preceding subject matter of this paragraph characterizes example 12 of the present disclosure, wherein example 12 also includes the subject matter according to example 11, above.

The gate assembly is configured to house a portion of the locking member. The gate assembly comprises a first arm configured to be contacted by the trigger, whereby the trigger is configured to release the portion of the locking member from the gate assembly. The preceding subject matter of this paragraph characterizes example 13 of the present disclosure, wherein example 13 also includes the subject matter according to any one of examples 11-12, above.

The slot is directed downward, and the trigger and anchor interact due to a force of gravity acting on the clasp to urge the clasp onto the anchor. The preceding subject matter of this paragraph characterizes example 14 of the present disclosure, wherein example 14 also includes the subject matter according to any one of examples 11-13, above.

The system further comprising a biasing member configured to urge the locking member toward a locked position. The gate assembly is configured to impede the locking member until the trigger is moved by the anchor. The preceding subject matter of this paragraph characterizes example 15 of the present disclosure, wherein example 15 also includes the subject matter according to any one of examples 11-14, above.

The system further comprising a lever arm coupled to the locking member. Movement of the lever arm causes the gate assembly to capture the locking member in an open position. The preceding subject matter of this paragraph characterizes example 16 of the present disclosure, wherein example 16 also includes the subject matter according to any one of examples 11-15, above.

Additionally disclosed herein is a method for securing a spanner bar to an anchor in an aircraft. The method comprises urging a spanner bar in a single direction toward an anchor, where the spanner bar has a clasp coupled to the spanner bar and the clasp has a slot and a trigger at least partially inhibiting access to the slot, so that the anchor contacts the trigger and thereby causes a locking member coupled to the trigger to lock the clasp to the anchor. The preceding subject matter of this paragraph characterizes example 17 of the present disclosure.

The clasp further comprises a gate assembly that prevents movement of the locking member until actuated by the trigger, the method further comprising actuating the trigger to release the locking member from the gate assembly. The preceding subject matter of this paragraph characterizes example 18 of the present disclosure, wherein example 18 also includes the subject matter according to example 17, above.

The locking member further comprises a lever arm, the method further comprising releasing the locking member by actuating the lever arm. The preceding subject matter of this paragraph characterizes example 19 of the present disclosure, wherein example 19 also includes the subject matter according to example 18, above.

Actuating the lever arm causes the gate mechanism to capture the locking member in an open position whereby the anchor is released from the clasp. The preceding subject matter of this paragraph characterizes example 20 of the present disclosure, wherein example 20 also includes the subject matter according to example 19, above The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
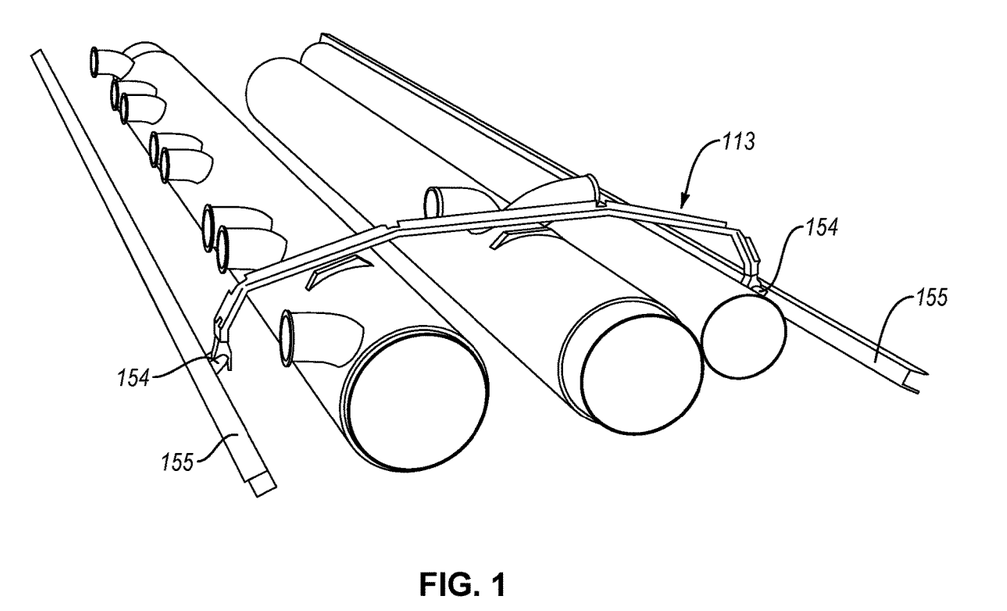
FIG. 1 is a perspective view of an environmental control system (ECS) duct and associated support structures, according to one or more examples of the present disclosure.

FIG. 1 is a schematic view of an environmental control system (ECS) duct 157 and associated support structures according to examples of the present disclosure. The systems and methods disclosed herein will be described with reference to the ECS duct 157; however, it is to be appreciated that the systems and methods can be used to support other structures without departing from the spirit and scope of the disclosure. The support structures include a locking spanner assembly 113 and anchors 154 to which the locking spanner assembly 113 is releasably coupled. In one example, each one of the anchors 154 forms part of a corresponding one of two rails 155. The two rails 155 are spaced apart from each other and extend along the fuselage of an aircraft, such as above a seating area, to provide support for an air conditioning or heating system for the cabin of the aircraft. However, in other examples, the rails 155 are configured to provide supporting functionality for other types of systems or assemblies of an aircraft or other mobile or stationary structures. Each one of the anchors 154 is a projection from a corresponding one of the rails 155, which will be shown to greater advantage in FIG. 9.

Figure 2:
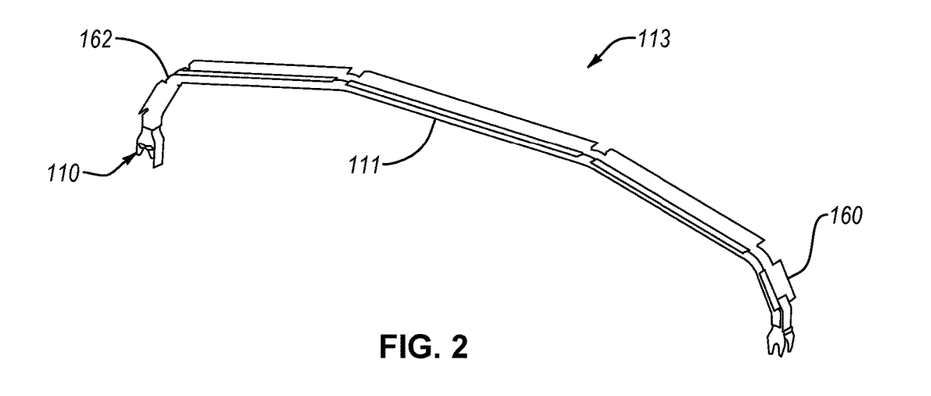
FIG. 2 is a perspective view of a locking spanner assembly, according to one or more examples of the present disclosure.

FIG. 2 is an isolated view of the locking spanner assembly 113 according to some examples of the present disclosure. The locking spanner assembly 113 includes a spanner bar 111 and opposing clasps 110. The spanner bar 111 extends over the ECS duct 157 and attaches to the anchors 154 on opposite sides of the ECS duct 157 via the opposing clasps 110. In some examples, the spanner bar 111 has an arched shape to accommodate the ECS duct 157. When building the aircraft, the portion of the aircraft near the ECS duct 157 is often difficult to access due to the constrictions of the surrounding environment, which has not been shown in this figure to avoid obscuring aspects of the locking spanner assembly 113. As will be explained, the locking spanner assembly 113 is configured to help couple the spanner bar 111 to the rails 155 when the space constraints make it difficult or impossible to use other attachment methods for coupling the spanner bar 111 to the rails 155.

As shown, the spanner bar 111 of the locking spanner assembly 113 has a first end 160 and a second end 162. The first end 160 and the second end 162 are on opposite ends of the spanner bar 111. The clasps 110 of the locking spanner assembly 113 are coupled to the spanner bar 111 at corresponding ones of the first end 160 and the second end 162 of the spanner bar 111. Although in the illustrated examples, the locking spanner assembly 113 has two clasps 110 on opposite ends of the spanner bar 111, in some examples, the locking spanner assembly 113 has only one clasp 110 at one end of the spanner bar 111, such that the opposite end of the spanner bar 111 does not have a clasp 110. It is also recognized that in certain examples the locking spanner assembly 113 include more than two clasps 110, such as four clasps 110, with more than one clasp 110 at each one of the opposite ends of the spanner bar 111. In some embodiments the clasps 110 at the ends are identical; in other embodiments they are different.

The first end 160 and the second end 162 are downwardly angled relative to the intermediate portion of the spanner bar 111 between the first end 160 and the second end 162. The downward angle of the first end 160 and the second end 162 allows the clasps 110 to be oriented in a downward directly (e.g., points downward) to facilitate attachment of the clasps 110 to corresponding anchors 154 in a downwardly direction from above the anchors 154. As the locking spanner assembly 113 is urged downwardly toward the anchors 154, the clasps 110 operate to engage corresponding anchors 154 and releasably interlock with the anchors 154 with a single movement (e.g., downward movement). In other words, a worker can push or pull the locking spanner assembly 113 downward onto the anchors 154 and the clasps 110 mechanically operate to lock to (e.g., interlock with) corresponding ones of the anchors 154. Accordingly, the worker need not actuate any tool or mechanism, such as a screw, clamp, or other device, with multiple independent motions. Instead, the worker need only urge the clasps 110 onto the anchors 154, which can be accomplished with movement of the locking spanner assembly 113 in a single direction. As used herein, movement in a single direction is not limited to a vertically downward linear, or straight downward, movement, but rather includes any movement having a vector component toward the anchors 154. Additionally, in certain examples, because the locking spanner assembly 113 is movable vertically downwardly into locking engagement with the anchors 154, the weight of the locking spanner assembly 113 can be utilized to help assist in (e.g., make easier) dropping the locking spanner assembly 113 into locking engagement with the anchors 154.

Figure 3:
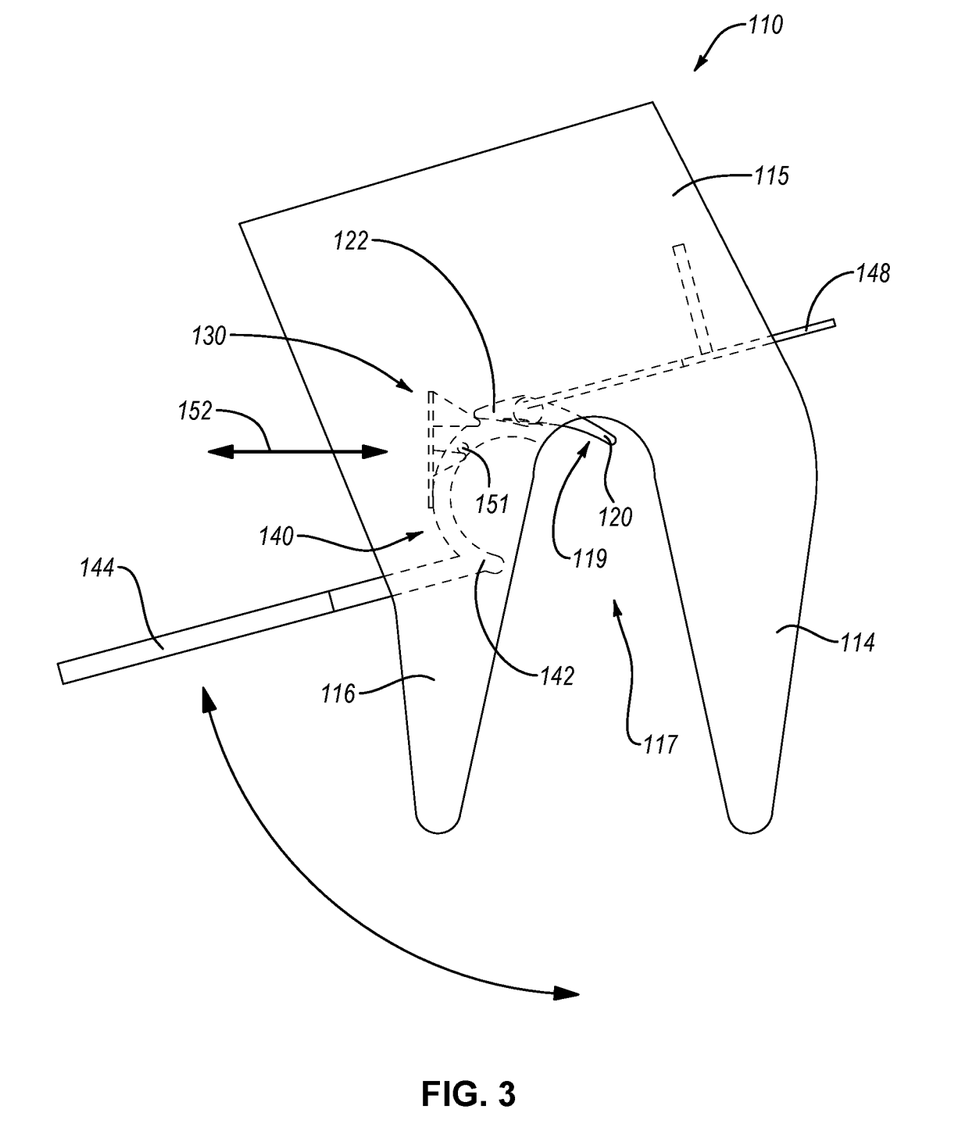
FIG. 3 is a side elevation view of a clasp of the locking spanner assembly of FIG. 2, according to one or more examples of the present disclosure.

FIG. 3 is a side view of one of the clasps 110 according to some examples of the present disclosure. The clasp 110 includes a bracket 115 having a first bracket arm 114 and a second bracket arm 116. The first bracket arm 114 and the second bracket arm 116 of the bracket 115 together form a fork shape with a slot 117 defined between the first bracket arm 114 and second bracket arm 116.

The clasp 110 also includes a trigger 119 that extends at least partially into the slot 117 such that when the clasp 110 is moved onto the anchor 154 the anchor 154 contacts the trigger 119 (e.g., a trigger tail 120 of the trigger 119) before reaching the furthest upward extent of the slot 117. The anchor 154 will move the trigger 119 to operate the clasp 110. The trigger 119 can include the trigger tail 120 and a trigger head 122. The trigger tail 120 extends into the slot 117. The trigger tail 120 rotates about a hinge in the trigger that holds the trigger relative to the bracket 115. In other examples, the trigger 119 can be linearly actuated and held in a slot in the bracket 115. The trigger head 122 extends opposite the trigger tail 120. In some examples, the trigger head 122 and trigger tail 120 rotate about separate hinges, coupled to the bracket 115, that are offset from one another. In other embodiments they rotate about a single hinge coupled to the bracket 115.

The clasp 110 additionally includes a gate assembly 130 and a locking member 140. The gate assembly 130 is contacted by the trigger head 122, which moves the gate assembly 130 from a closed position toward an open position. The gate assembly 130 can include a biasing member (not shown) that urges the gate assembly 130 toward the closed position. The locking member 140 has a pin 151 that is held in the gate assembly 130 when the gate assembly 130 is in the closed position. When the trigger 119 is actuated, the trigger head 122 opens the gate assembly 130, thereby releasing the pin 151 of the locking member 140, which then is urged by a biasing member (not shown) toward a locked position around the anchor 154.

In certain examples, the clasp 110 has a second bracket that is spaced apart and offset from the bracket 115 in a direction into the page as shown in FIG. 3 to provide stability to the clasp 110. In such examples, the trigger and gate components of the clasp 110 are positioned between the two brackets.

The locking member 140 includes a lever arm 144, a locking portion 142, an indicia member 148, and the pin 151. The locking portion 142 can be generally circular to engage an anchor 154 having a corresponding cylindrical shape. Other shapes are possible to engage anchors with non-cylindrical shapes. The lever arm 144 can extend in a convenient direction which may vary depending on where the assembly is deployed, as well as the surrounding environment. The indicia member 148 can be useful to provide an indication of whether or not the locking member 140 is locked to the anchor. In some examples, the indicia member 148 and lever arm 144 can be the same lever extending from the locking portion 142.

When the clasp 110 is released, such as by movement of a lever arm 144, the locking member 140 rotates back toward an unlocked position and the pin 151 enters the gate assembly 130, which, once again, holds the locking member 140 in an unlocked position. The clasp 110 is then immediately ready to be locked to the anchor again if desired. The gate assembly 130 holds the pin 151 in place allowing for a simple, straightforward operation.

Figure 4:
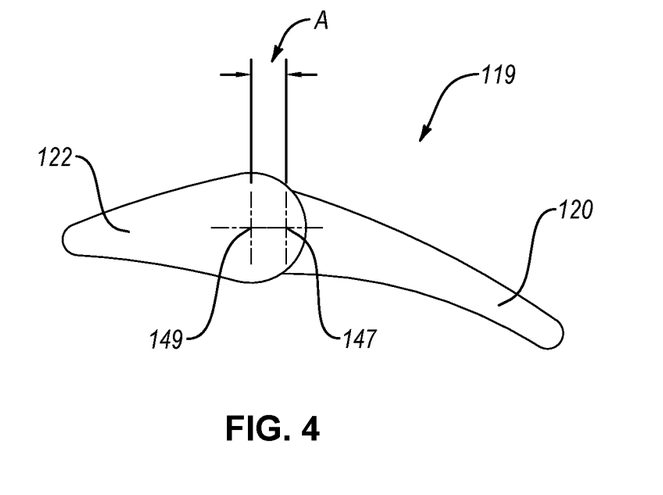
FIG. 4 is a side elevation view of a trigger of the clasp of FIG. 3, according to one or more examples of the present disclosure.
Figure 5:
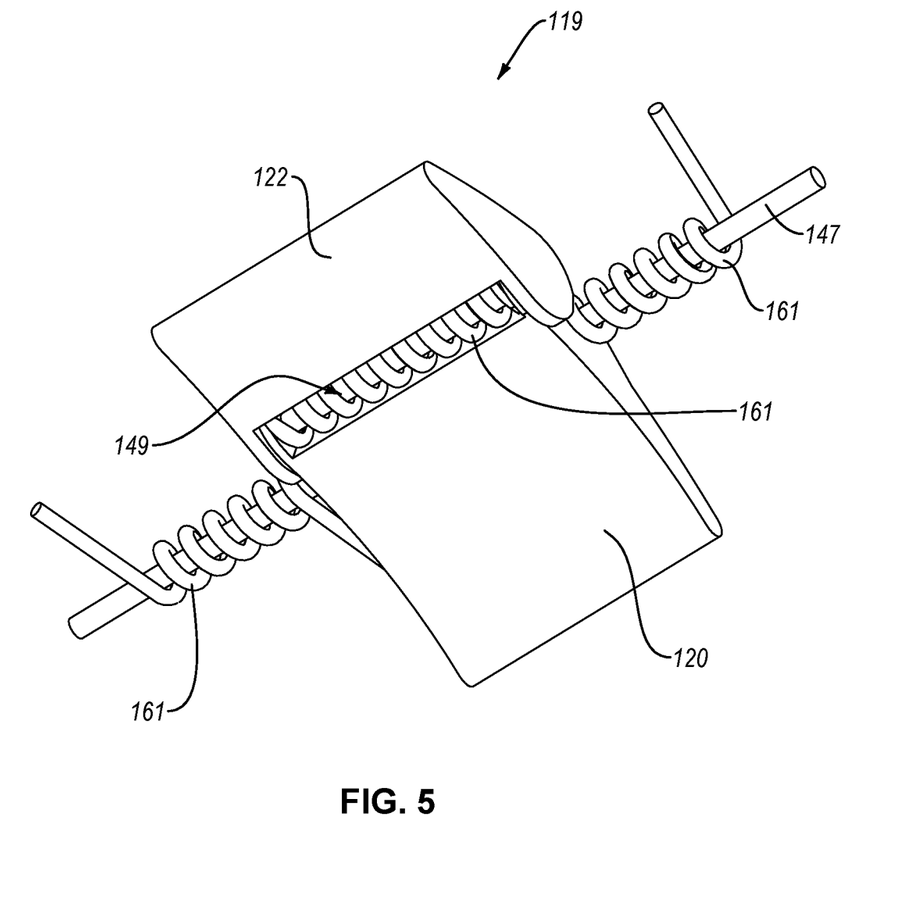
FIG. 5 is a perspective view of the trigger of the clasp of FIG. 3, according to one or more examples of the present disclosure.

FIG. 4 is a side view of the trigger 119 according to embodiments of the present disclosure. In addition to the trigger tail 120 and the trigger head 122 described above, the trigger 119 also includes a first hinge 147 and a second hinge 149. The trigger tail 120 rotates about the first hinge 147 and the trigger head 122 rotates about the second hinge 149. The first hinge 147 is offset from the second hinge 149 by a distance A in some examples. Moreover, the first hinge 147 and the second hinge 149 are fixed relative to the bracket(s) 115. According to one example, shown in FIG. 5, the first hinge 147 and the second hinge 149 each has a biasing member 161 that maintains the trigger tail 120 and the trigger head 122 in place until the anchor enters the slot 117 in the bracket 115.

Figure 6:
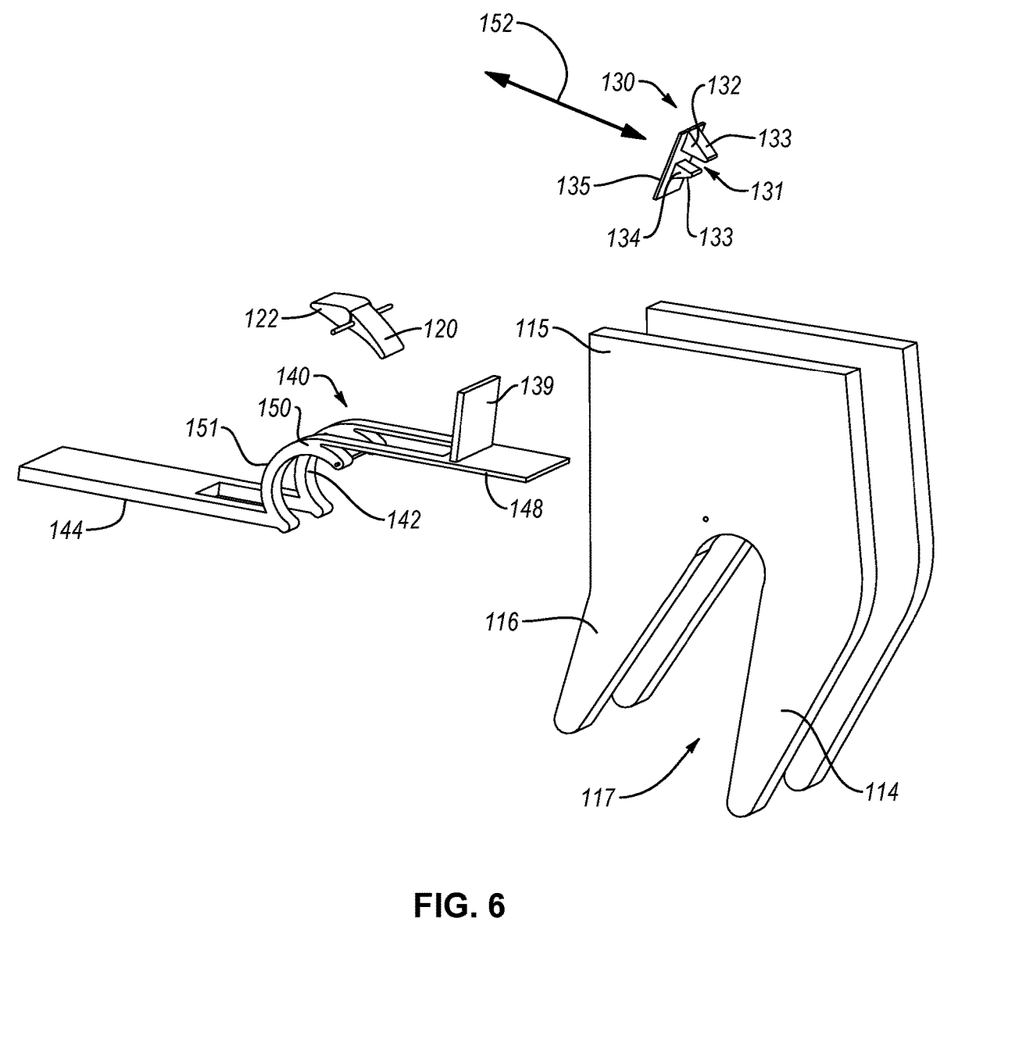
FIG. 6 is an exploded side elevation view of the clasp of FIG. 3, according to one or more examples of the present disclosure.

FIG. 6 is an exploded view of FIG. 3 according to examples of the present disclosure. The bracket 115 includes the first bracket arm 114 and second bracket arm 116, which define a slot 117 between them. The gate assembly 130 includes a first gate arm 132, which has a cam surface 133, and a second gate arm 134, which also has a cam surface 133. The gate assembly 130 also includes a backplate 135 holding the first and second gate arms together. The space between the gate arms defines a gate recess 131. The backplate 135 can be used to guide the gate assembly 130 along a path 152. The path 152 can be linear or non-linear and allows the gate assembly 130 to move between the open and closed positions. There is also a biasing member (not shown) to urge the gate assembly 130 toward the closed position. The cam surfaces 133 allow the trigger head 122 and pin 151 to move the gate assembly 130 along the path 152. The shape of the cam surfaces 133 depends on the geometry of the trigger head 122 and pin 151. In some embodiments the cam surfaces 133 can be flat, ramped, curved, or any other suitable shape to allow movement along the path 152.

The trigger head 122 and trigger tail 120 are shown separated from one another. The size and shape of the trigger head 122 and trigger tail 120 can vary to provide sufficient leverage to allow the clasp 110 to be actuated easily and maintain itself in place on the anchor 154 when locked thereto.

The locking member 140 is also shown. It includes the indicia member 148, the locking portion 142, the hinge 150, the pin 151, and the lever arm 144 (release arm). The indicia member 148 in this example shows a protrusion 139 that is visible when open and not visible when closed (or vice versa) depending on the geometry and visibility of the environment in which the assembly is deployed. In some examples, the indicia member 148 or some portion thereof can be brightly colored or have a light or other noticeable feature. The locking portion 142 can have a circular profile to complement the anchor 154. In this example, the locking portion 142 is slightly larger than a semi-circle to engage the anchor. In other examples, the locking portion 142 can be more or less of a circle and can even have a different shape entirely. The lever arm 144 in this example extends from the locking portion 142 opposite the indicia member 148, but in other examples the lever arm 144 serves as the indicia member 148 or vice versa. The lever arm 144 can be sufficiently long to provide leverage to release the mechanism.

Figure 7:
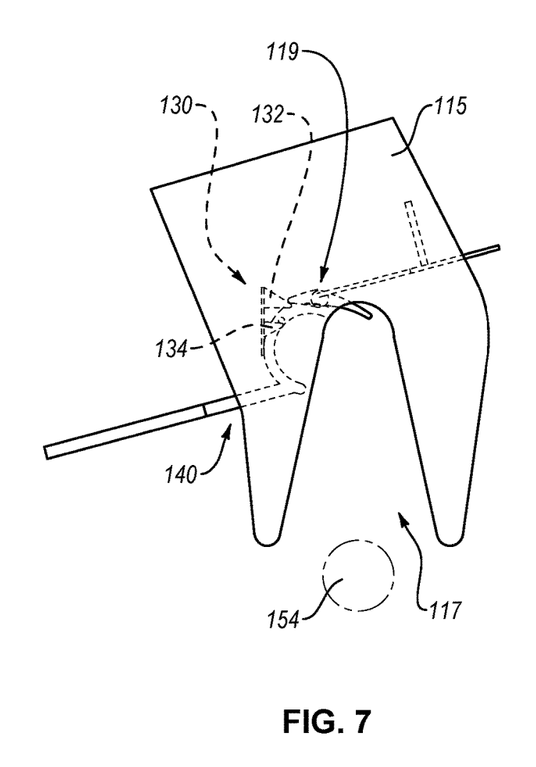
FIG. 7 is a side elevation view of the clasp of FIG. 3, shown in an unlocked position relative to an anchor, according to one or more examples of the present disclosure.
Figure 8:
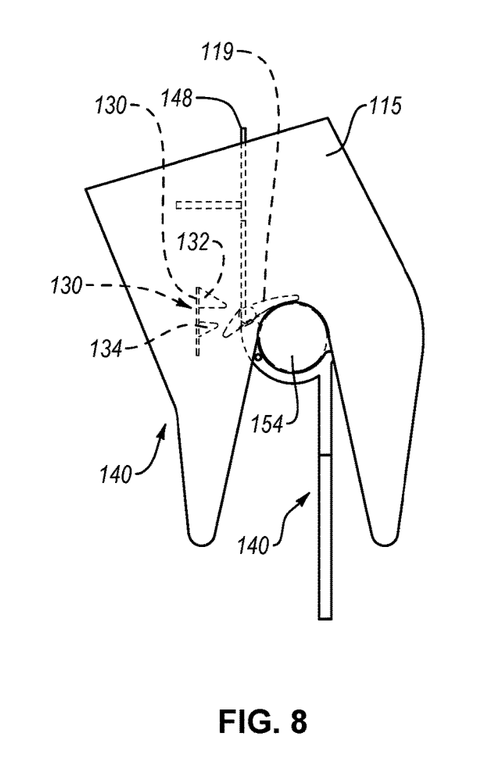
FIG. 8 is a side elevation view of the clasp of FIG. 3, shown in a locked position relative to the anchor, according to one or more examples of the present disclosure.

FIGS. 7 and 8 show the clasp 110 in an unlocked (e.g., pre-locked) position and a locked position, respectively. FIGS. 7 and 8 will be addressed simultaneously to facilitate understanding of the features and functionality of the clasp 110. Referring to FIG. 7, the anchor 154 enters the slot 117 and before it reaches the deepest extent of the slot 117, it contacts the trigger 119 and moves the trigger at least partially out of the slot 117 (see, e.g., FIG. 8). The anchor 154 need not reach the deepest extent of the slot 117 and may fully actuate the clasp 110 before contacting or being fully seated in the bracket 115. The clasp 110 may therefore be a loose coupling to the anchor 154 that allows some movement within the clasp 110. In other embodiments the clasp 110 locks tightly to the anchor 154.

Movement of the trigger 119 by the anchor 154 causes the trigger 119 to contact and thereby open the gate assembly 130. FIG. 8 shows the gate assembly 130 moved to the left in the open position. In the open position, the gate assembly 130 releases the pin 151 from between the first gate arm 132 and second gate arm 134 of the gate assembly. Once the pin 151 is released, the locking member 140 moves to a locked position in which the locking member 140 at least partially grasps and retains the anchor 154. FIG. 8 shows the locking portion 142 partially encircling the anchor 154 and helping to form a nearly complete enclosure of the anchor 154 between the locking portion 142 and the bracket 115.

In the illustrated example, the object (e.g., the anchor 154) that triggers the clasp 110 is the same object that the locking member 140 engages. In other examples, the object that triggers the clasp 110 may be different than the object that the locking member 140 engages. In the latter examples, the two objects can be remote from one another, and the shape and size of the components define the relative location and size of each.

Figure 9:
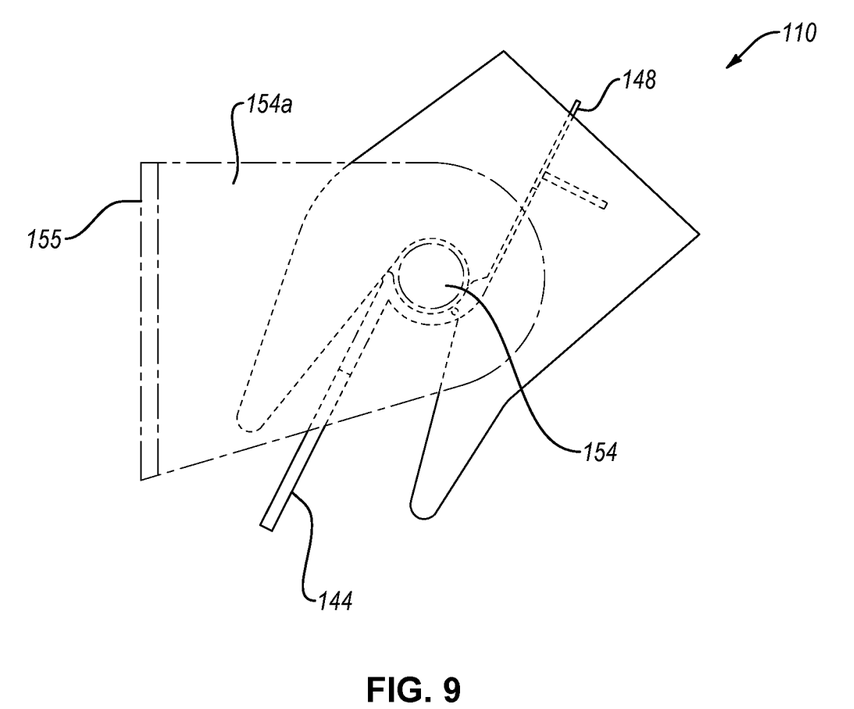
FIG. 9 is a side elevation view of the clasp of FIG. 3, shown in a locked position relative to the anchor, according to one or more examples of the present disclosure.

FIG. 9 shows the clasp 110 in a locked position relative to the anchor 154 according to some examples of the present disclosure. The anchor 154 is shown coupled to a bracket 154a that is coupled to one of the rails 155 (see, e.g., FIG. 1). The bracket 154a may be one of two spaced apart brackets between which the anchor 154 extends. The lever arm 144 is shown protruding downward in a convenient position to allow the clasp 110 to be released, and the indicia member 148 is visible. To secure the clasp 110 to the anchor 154, the worker need only push or pull the clasp toward the anchor 154 and with no further action the clasp 110 will lock to the anchor 154. Releasing the clasp 110 resets the clasp 110 to a ready state from which it can be once again secured to another anchor 154. This process can repeat as often as needed.

Figure 10:
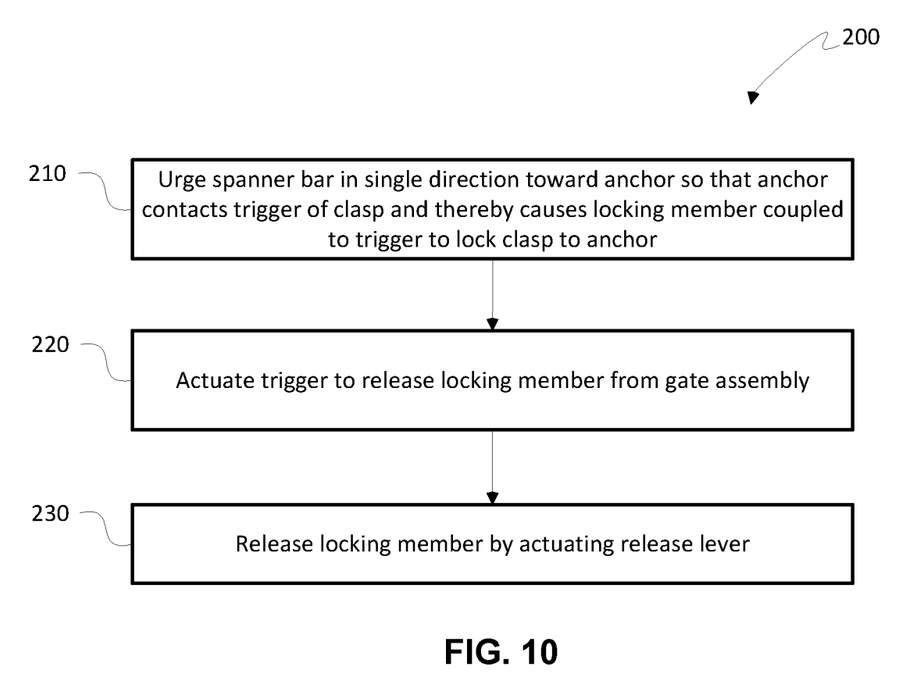
FIG. 10 is a schematic flow diagram of a method of securing a spanner bar to an anchor of an aircraft, according to one or more examples of the present disclosure.

Referring to FIG. 10, according to one example, a method 200 of securing a spanner bar to an anchor of an aircraft is shown. The method 200 can be executed using the locking spanner assembly 113 described above. The method 200 includes (block 210) urging the spanner bar 111 in a single direction toward the anchor 154 so that the anchor 154 contacts the trigger 119 and thereby causes the locking member 140 to lock the clasp 110 to the anchor 154. In some examples, the method 200 also includes actuating the trigger 119 to release the locking member 140 from the gate assembly 130. In yet further examples, the method 200 includes releasing the locking member 140 by actuating the lever arm 144.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A locking spanner assembly, comprising:
a bracket comprising a first bracket arm, a second bracket arm, and a slot defined between the first bracket arm and the second bracket arm, wherein the slot is configured to receive an anchor;
a trigger movably coupled to the bracket and movable relative to the bracket between a first position, in which a portion of the trigger extends into the slot, and a second position, wherein as the anchor is fully seated into the slot the anchor causes the trigger to move from the first position to the second position;
a gate assembly movably coupled to the bracket and movable relative to the trigger along a path between a locked position and an unlocked position, wherein the gate assembly comprises a first gate arm, a second gate arm, and a gate recess defined between the first gate arm and the second gate arm, wherein the first gate arm has a cam surface configured to engage with the trigger such that movement of the trigger from the first position to the second position causes the gate assembly to move from the locked position to the unlocked position along the path; and
a locking member rotatably coupled to the bracket and comprising a locking portion, a hinge, and a pin, wherein the locking member is rotatable about the hinge between an open position, in which the pin is within the gate recess and no more than a first portion of the locking portion is within the slot, and a closed position, in which the pin is out of the gate recess and more than the first portion of the locking portion is within the slot, and wherein the locking member rotates from the open position to the closed position as the gate assembly moves from the locked position to the unlocked position such that in the closed position the locking portion of the locking member retains the anchor within the slot.

2. The locking spanner assembly of claim 1, wherein:
the trigger comprises a trigger head and a trigger tail;
the trigger tail extends into the slot when the trigger is in the first position; and
the trigger head is shaped to contact the gate assembly such that movement of the trigger from the first position to the second position causes the gate assembly to move from the locked position to the unlocked position.

3. The locking spanner assembly of claim 1, wherein:
the locking member further comprises a lever arm that extends from and is non-movably fixed to the locking portion of the locking member; and
pivoting the lever arm about the hinge from the closed position to the locked position causes the locking portion to release from the anchor.

4. The locking spanner assembly of claim 1, wherein rotation of the locking member from the closed position to the open position causes the pin to contact the second gate arm and to move the gate assembly along the path to permit the pin to enter the gate recess.

5. The locking spanner assembly of claim 1, wherein the movement of the bracket toward the anchor in a single direction causes the locking spanner assembly to lock onto the anchor.

6. The locking spanner assembly of claim 1, wherein the locking member further comprises an indicia member that is one of:
visible, from a given location, when the locking member is in the locked position and not visible, from the given location, when the locking member in the open position; or
visible, from the given location, when the locking member is in the open position and not visible, from the given location, when the locking member in the locked position.

7. The locking spanner assembly of claim 1, wherein the locking spanner assembly is configured to support an environmental control systems duct, and wherein the locking spanner assembly and the environmental control systems duct are in an aircraft.

8. The locking spanner assembly of claim 1, wherein the path of the gate assembly between a locked position and an unlocked position is a linear path.

9. The locking spanner assembly of claim 1, wherein the gate assembly further comprises a biasing member urging the gate assembly toward the locked position.

10. The locking spanner assembly of claim 1, wherein:
the trigger comprises a trigger tail and a trigger head;
the trigger tail extends at least partially into the slot;
the trigger head is configured to contact the gate assembly; and
forced rotation of the trigger tail causes rotation of the trigger head, but forced rotation of the trigger head does not cause rotation of the trigger tail.

11. A system for supporting a duct in an aircraft, the system comprising:
a duct configured to conduct fluid in the aircraft;
a spanner bar configured to support the duct in the aircraft, the spanner bar having a first end and a second end;
an anchor; and
a clasp at each of the first end and the second end of the spanner bar, wherein each clasp comprises:
a bracket comprising a first bracket arm, a second bracket arm, and a slot defined between the first bracket arm and the second bracket arm, wherein the slot is configured to receive an anchor;
a trigger movably coupled to the bracket and movable relative to the bracket between a first position, in which a portion of the trigger extends into the slot, and a second position, wherein as the anchor is fully seated into the slot the anchor causes the trigger to move from the first position to the second position;
a gate assembly movably coupled to the bracket and movable relative to the trigger along a path between a locked position and an unlocked position, wherein the gate assembly comprises a first gate arm, a second gate arm, and a gate recess defined between the first gate arm and the second gate arm, wherein the first gate arm has a cam surface configured to engage with the trigger such that movement of the trigger from the first position to the second position causes the gate assembly to move from the locked position to the unlocked position along the path; and
a locking member rotatably coupled to the bracket and comprising a locking portion, a hinge, and a pin, wherein the locking member is rotatable about the hinge between an open position, in which the pin is within the gate recess and no more than a first portion of the locking portion is within the slot, and a closed position, in which the pin is out of the gate recess and more than the first portion of the locking portion is within the slot, and wherein the locking member rotates from the open position to the closed position as the gate assembly moves from the locked position to the unlocked position such that in the closed position the locking portion of the locking member retains the anchor within the slot.

12. The system of claim 11, further comprising an indicia member configured to be one of:
- visible, from a given location, when the locking member is in the locked position and not visible, from the given location, when the locking member is in the open position; or
- visible, from the given location, when the locking member is in the open position and not visible, from the given location, when the locking member is in the locked position.

13. The system of claim 11, wherein the gate assembly is configured to house a portion of the locking member, wherein the first arm is configured to be contacted by the trigger, whereby the trigger is configured to release the portion of the locking member from the gate assembly.

14. The system of claim 11, wherein the slot is directed downward and wherein the trigger and anchor interact due to a force of gravity acting on the corresponding clasp to urge the clasp onto the anchor.

15. The system of claim 11, further comprising a biasing member configured to urge the locking member toward a locked position, and wherein the gate assembly is configured to impede the locking member until the trigger is moved by the anchor.

16. The system of claim 11, further comprising a lever arm coupled to the locking member, wherein movement of the lever arm causes the gate assembly to capture the locking member in an open position.

17. A method for securing a spanner bar to an anchor in an aircraft, the method comprising:
- urging a spanner bar in a single direction toward an anchor, where the spanner bar has a clasp coupled to the spanner bar and the clasp comprises:
  - a bracket comprising a first bracket arm, a second bracket arm, and a slot defined between the first bracket arm and the second bracket arm, wherein the slot is configured to receive an anchor;
  - a trigger movably coupled to the bracket and movable relative to the bracket between a first position, in which a portion of the trigger extends into the slot, and a second position, wherein as the anchor is fully seated into the slot the anchor causes the trigger to move from the first position to the second position;
  - a gate assembly movably coupled to the bracket and movable relative to the trigger along a path between a locked position and an unlocked position, wherein the gate assembly comprises a first gate arm, a second gate arm, and a gate recess defined between the first gate arm and the second gate arm, wherein the first gate arm has a cam surface configured to engage with the trigger such that movement of the trigger from the first position to the second position causes the gate assembly to move from the locked position to the unlocked position along the path; and
  - a locking member rotatably coupled to the bracket and comprising a locking portion, a hinge, and a pin, wherein the locking member is rotatable about the hinge between an open position, in which the pin is within the gate recess and no more than a first portion of the locking portion is within the slot, and a closed position, in which the pin is out of the gate recess and more than the first portion of the locking portion is within the slot, and wherein the locking member rotates from the open position to the closed position as the gate assembly moves from the locked position to the unlocked position such that in the closed position the locking portion of the locking member retains the anchor within the slot;
- wherein the spanner bar is urged in the single direction toward the anchor so that the anchor contacts the trigger and thereby causes a locking member coupled to the trigger to lock the clasp to the anchor.

18. The method of claim 17, wherein the gate assembly prevents movement of the locking member until actuated by the trigger, the method further comprising actuating the trigger to release the locking member from the gate assembly.

19. The method of claim 18, wherein the locking member further comprises a lever arm, the method further comprising releasing the locking member by actuating the lever arm.

20. The method of claim 19, wherein actuating the lever arm causes the gate mechanism to capture the locking member in the open position whereby the anchor is released from the clasp.

* * * * *